(12) United States Patent
Dennis et al.

(10) Patent No.: US 10,760,631 B1
(45) Date of Patent: Sep. 1, 2020

(54) HYDRAULIC CALIPER BRAKE ASSEMBLY FOR MULTIPLE ROTOR THICKNESSES, DIAMETERS, AND AXIAL OFFSETS

(71) Applicant: Ausco Products, Inc., Benton Harbor, MI (US)

(72) Inventors: Brian P. Dennis, Kalamazoo, MI (US); Kenneth A. Dodd, Dowagiac, MI (US); Keith McAllister, Kalamazoo, MI (US); James Haines, Edwardsburg, MI (US)

(73) Assignee: AUSCO PRODUCTS, INC., Benton Harbor, MI (US)

( * ) Notice: Subject to any disclaimer, the term of this patent is extended or adjusted under 35 U.S.C. 154(b) by 108 days.

(21) Appl. No.: 15/893,144

(22) Filed: Feb. 9, 2018

Related U.S. Application Data

(60) Provisional application No. 62/555,826, filed on Sep. 8, 2017.

(51) Int. Cl.
| | |
|---|---|
| *F16D 65/095* | (2006.01) |
| *F16D 65/00* | (2006.01) |
| *F16D 55/225* | (2006.01) |
| *F16D 65/18* | (2006.01) |
| *F16D 121/04* | (2012.01) |
| *F16D 55/00* | (2006.01) |

(52) U.S. Cl.
CPC .......... *F16D 65/095* (2013.01); *F16D 55/225* (2013.01); *F16D 65/0075* (2013.01); *F16D 65/0087* (2013.01); *F16D 65/0093* (2013.01); *F16D 65/18* (2013.01); *F16D 2055/002* (2013.01); *F16D 2055/007* (2013.01); *F16D 2121/04* (2013.01); *F16D 2250/0084* (2013.01)

(58) Field of Classification Search
CPC .... F16D 55/225; F16D 55/228; F16D 55/224; F16D 65/095; F16D 65/0075; F16D 65/0087; F16D 65/0093; F16D 65/18; F16D 65/0068; F16D 65/092; F16D 65/0973; F16D 65/0975; F16D 2055/002; F16D 2055/007; F16D 2055/0041; F16D 2121/04; F16D 2250/0084
USPC ........ 188/72.5, 26, 71.1, 72.3, 73.31, 73.32, 188/73.36, 73.38, 73.47, 234, 251 R, 344
See application file for complete search history.

(56) References Cited

U.S. PATENT DOCUMENTS 3,675,743 A * 7/1972 Thompson ............ F16D 55/228
 188/72.5
3,848,708 A * 11/1974 Noguchi ............. F16D 65/0006
 188/73.1

(Continued)

*Primary Examiner* — Robert A. Siconolfi
*Assistant Examiner* — San M Aung
(74) *Attorney, Agent, or Firm* — Renner Kenner Greive Bobak Taylor & Weber

(57) ABSTRACT

A caliper brake (10) includes a housing (12) formed of a first housing portion (16) and a second housing portion (18). Each of the first housing portion and second housing portion include a channel (104) extending therethrough. The channels (104) include pins (102) for receiving one or more shims (94) thereon. Brake (10) includes a first stator assembly (60) and a second stator assembly (64) that are separated by a first distance when no shims (94) are on the pins (102). The first stator assembly (60) and the second stator assembly (64) are separated by a second distance less than the first distance when one or more shims (94) are on the pins (102).

16 Claims, 11 Drawing Sheets

(56) References Cited

U.S. PATENT DOCUMENTS

| | | | | |
|---|---|---|---|---|
| 5,020,643 | A | * | 6/1991 | Redenbarger ......... F16D 55/227 188/196 M |
| 5,186,286 | A | * | 2/1993 | Lindberg ................ F16D 55/28 188/161 |
| 5,284,227 | A | * | 2/1994 | Pelfrey ................... B62L 1/005 188/71.1 |
| 2004/0154885 | A1 | * | 8/2004 | Gotti ..................... F16D 65/092 188/250 B |
| 2011/0127126 | A1 | * | 6/2011 | Ciotti ................... F16D 65/095 188/219.1 |
| 2014/0299424 | A1 | * | 10/2014 | Arakane ............... F16D 55/228 188/73.32 |
| 2015/0027821 | A1 | * | 1/2015 | Nessi ................. F16D 65/0975 188/72.3 |
| 2015/0183488 | A1 | * | 7/2015 | Hirotomi ................ F16D 65/18 188/26 |

* cited by examiner

SECTION A-A

SECTION B-B

SECTION C-C

SECTION E-E

SECTION F-F

HYDRAULIC CALIPER BRAKE ASSEMBLY FOR MULTIPLE ROTOR THICKNESSES, DIAMETERS, AND AXIAL OFFSETS

CROSS REFERENCE TO RELATED APPLICATION

This application claims the benefit of U.S. Provisional Application No. 62/555,826, filed Sep. 8, 2017, which is incorporated herein by reference.

TECHNICAL FIELD

This invention relates to a caliper brake. The invention further relates to a hydraulic caliper brake capable of receiving one or more shims to enable the brake to be used with multiple rotor thicknesses, diameters, and axial offset distances.

BACKGROUND

Line tensioning equipment commonly uses caliper brakes, some of which are hydraulic. Known hydraulic brake calipers do not lend themselves well to being adaptable to different rotor widths and differing axial distances from the mounting face of the brake to the rotor. These brakes are of a fixed mount design, that is, the brake is rigidly mounted to the frame of the machine.

Certain prior art examples utilize spacers of various thicknesses to accommodate different rotor thicknesses and axial offset positions. These brakes are generally built in three pieces, two halves with a spacer positioned therebetween. Each of the outer halves of the brake contains a piston, and a spacer is placed between the two outer halves to increase the length of the brake to accommodate different rotor thicknesses. Various spacer lengths may be utilized to bridge the halves over the rotor. One drawback to this design is the brake must be taken apart to install the correct spacer. This requires correct installation by an installer. For example, if the brake assembly bolts are not properly torqued at reassembly, the bolts may fatigue and break during brake operation.

These designs also include a crossover tube. The crossover tube enables the two pistons to be hydraulically connected to the same hydraulic source, such that the pistons see the same hydraulic pressure. The crossover tube is externally mounted and therefore is exposed. When changing spacers, the crossover tube has to be disconnected and bent to accommodate the new length of the caliper. This may create leak paths or damage the tube.

Thus, there remains a need for an improved caliper brake that offers one or more improvements over the prior art.

DISCLOSURE OF THE INVENTION

It is thus an object of one aspect of the present invention to provide a caliper brake that may accommodate various axial rotor locations and rotor thicknesses without having to disassemble the brake.

It is an object of another aspect of the present invention to provide a caliper brake, as above, that does not require disassembly of a crossover tube to accommodate differing rotor thickness.

It is an object of a further aspect of the present invention to provide a caliper brake, as above, that does not require an expensive spacer component.

It is an object of an additional aspect of the present invention to provide a caliper brake, as above, that allows the stator pads to be serviced while mounted.

These and other objects of the present invention, as well as the advantages thereof over existing prior art forms, which will become apparent from the description to follow, are accomplished by the improvements hereinafter described and claimed.

In general, a brake made in accordance with the present invention includes a housing formed of a first housing portion and a second housing portion. Each of the first housing portion and second housing portion include a channel extending therethrough. The channels include pins for receiving one or more shims thereon.

In accordance with another aspect of the invention the brake includes one or more pins capable of receiving one or more shims. The brake further includes a first hydraulic channel providing hydraulic fluid behind a first end of a first piston and a second hydraulic channel providing hydraulic fluid behind a first end of a second piston. The first piston includes a second end abutting a first stator assembly and the second piston includes a second end abutting a second stator assembly. The first stator assembly and the second stator assembly are separated by a first distance when no shims are on the pins. The first stator assembly and the second stator assembly are separated by a second distance less than the first distance when one or more shims are on the pins.

In accordance with yet another aspect of the invention, a method of adjusting a brake includes moving a first stator assembly toward a second stator assembly and installing, between the first stator assembly and a first piston, one or more shims on one or more pins.

A preferred exemplary brake according to the concepts of the present invention is shown by way of example in the accompanying drawings without attempting to show all the various forms and modifications in which the invention might be embodied, the invention being measured by the appended claims and not by the details of the specification.

PREFERRED EMBODIMENT FOR CARRYING OUT THE INVENTION

Figure 1:
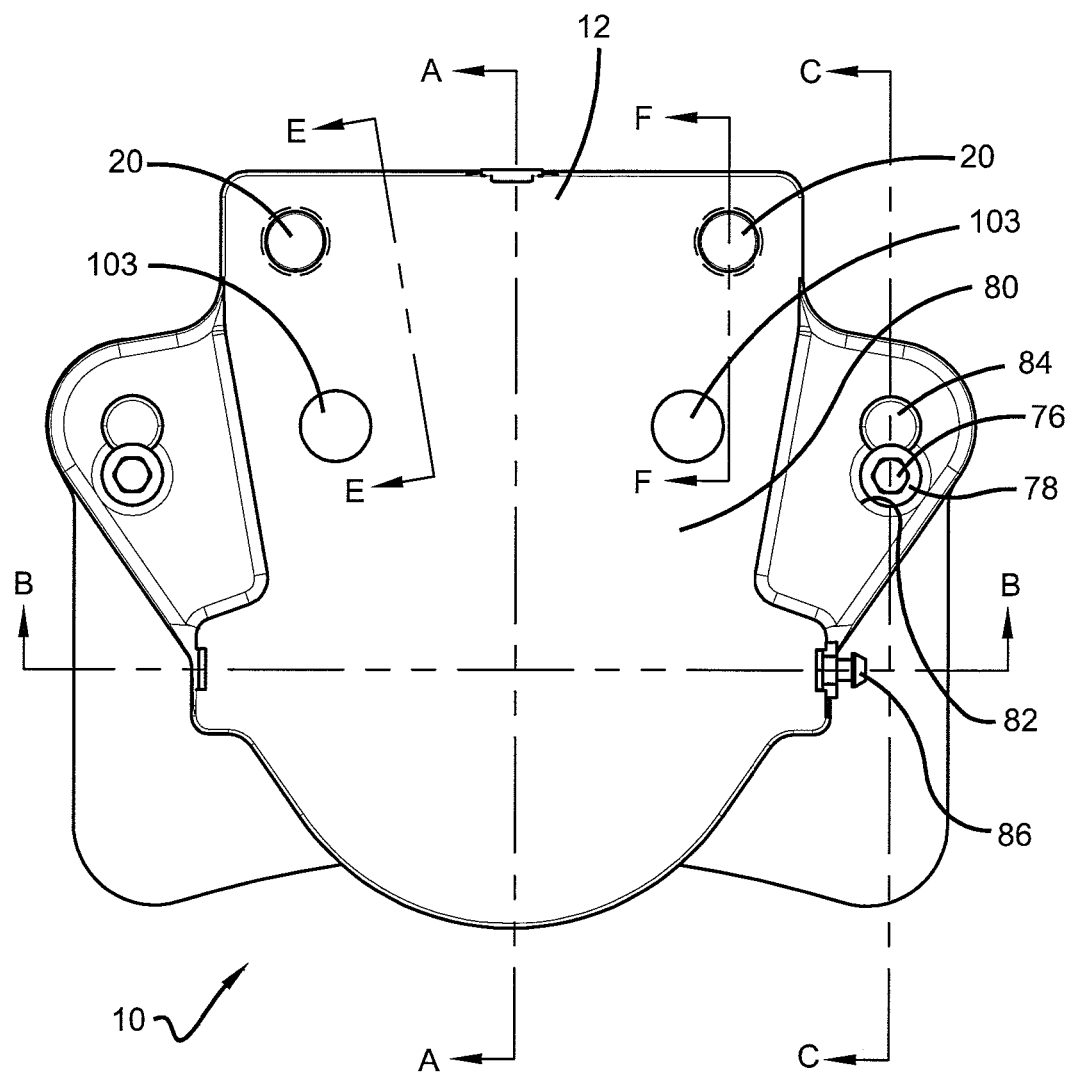
FIG. 1 is a front elevational view of a caliper brake according to the concepts of the present invention.
Figure 2:
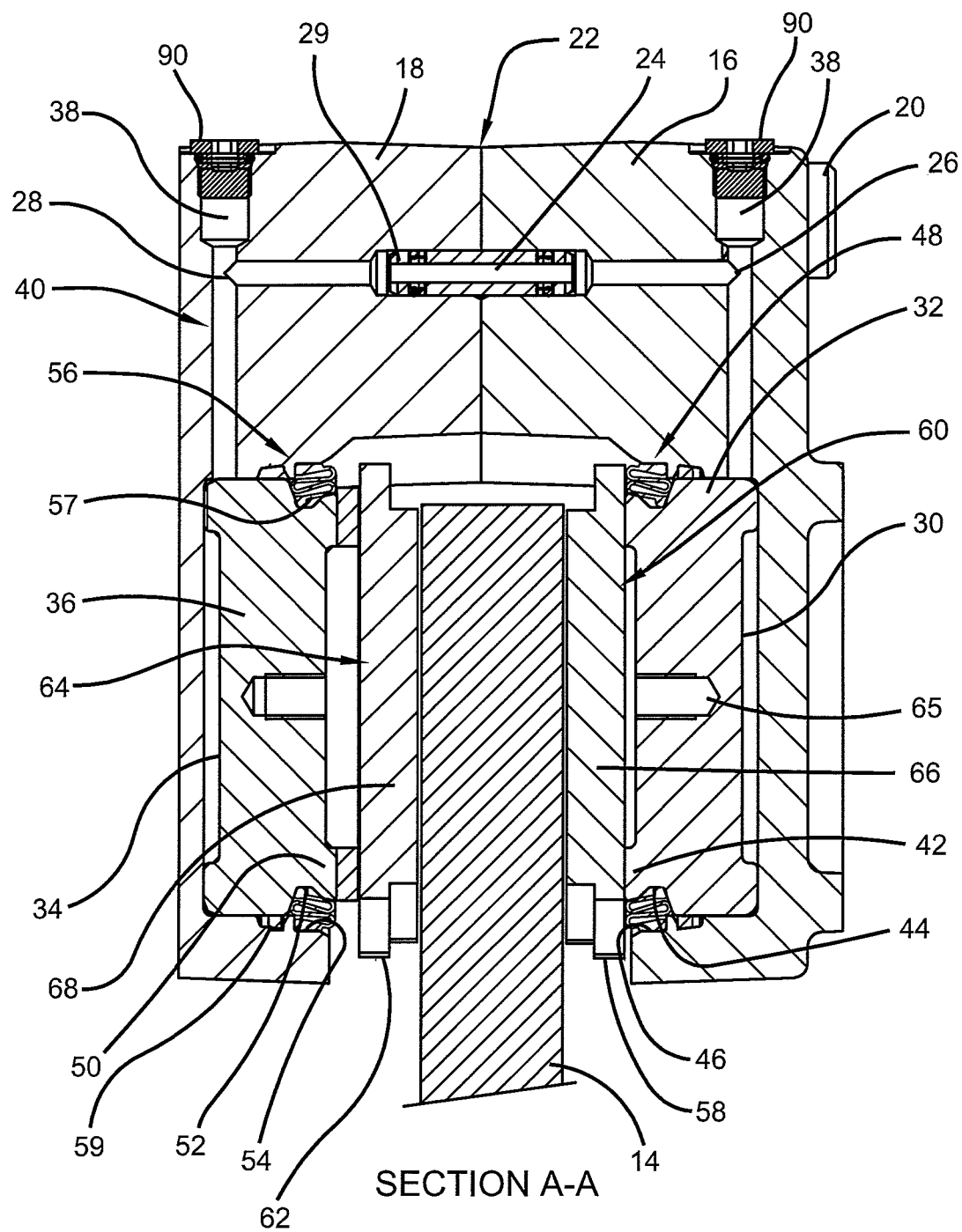
FIG. 2 is a sectional view of a caliper brake according to the concepts of the present invention taken substantially along line A-A of FIG. 1, and showing a rotor in position between the stators.

A caliper brake according to the concepts of the present invention is generally indicated by the numeral 10. Caliper brake 10, which may also be referred to as hydraulic caliper brake 10, includes a housing, generally indicated by the numeral 12, that carries and protects components of brake 10 and locates it in operative relation to a rotor 14. Embodiments of the invention may be particularly useful for a rotor mounted to a reel (not shown), also known as a tensioner, such as is commonly used by the electrical powerline installation industry. A mounting flange (not shown) may be located in close proximity to the reel. This mounting flange may be used to fixedly mount hydraulic caliper brake 10. Brake 10 may therefore be referred to as a fixed, dual-opposed-piston, caliper. The reel and mounting flange may also be utilized in association with a frame (not shown).

Housing 12 may be made from a first portion 16 and a second portion 18 that are joined together by a pair of bolts 20. A portion of first housing portion 16 and a portion of second housing portion 18 form a bridge, generally indicated by the numeral 22, positioned over rotor 14. A cross porthole 24 extends through bridge 22, and is in fluid communication with a first fluid chamber 26 and a second fluid chamber 28, with each end of cross porthole 24 abutting the respective fluid chamber. Cross porthole 24 may include a centrally positioned connector tube 29 located between first portion 16 and second portion 18. Connector tube 29 provides a seal to ensure that no fluid escapes from brake 10. Connector tube 29 eliminates the need for an external hydraulic brake tube.

First fluid chamber 26 is in fluid communication with a piston back opening 30 of a first piston 32 and second fluid chamber 28 is in fluid communication with a piston back opening 34 of a second piston 36. In the "default" position of caliper brake 10, that is, when hydraulic pressure provided to brake 10 is "zero", brake 10 is in a released, non-braking state. To actuate brake 10, hydraulic fluid enters at least one of the inlet ports 38 and fills all the cavities of the brake fluid chamber, generally indicated by the numeral 40. Hydraulic fluid may be provided to brake fluid chamber 40 by any known technique, such as through the use of a manual hand pump. Actuation via a hand pump may give an operator the ability to have control of an associated feed and tensioning system where brake 10 is utilized to create drag on a powerline. Hydraulic fluid may be provided to brake 10 at any desired pressure and through any of the one or more hydraulic inlet ports 38. The inclusion of multiple ports 38 allows brake 10 to be mounted at different angles and the ability to bleed or remove all air from the inlet hydraulic line. Having multiple inlet ports 38 may also better accommodate a manual hand pump.

As brake fluid chamber 40 pressurizes with hydraulic fluid, pistons 32, 36 will advance toward rotor 14 once the pressure overcomes the force resisting each piston 32, 36. The resisting force on pistons 32, 36 is provided by drag from a corresponding square ring 59 and some minor drag from a corresponding piston boot 57. First piston 32 includes a projecting flange 42 with a reduced diameter cylindrical surface 44 that operates in a reduced diameter chamber 46 in bore 48, and second piston 36 includes a projecting flange 50 with a reduced diameter cylindrical surface 52 that operates in a reduced diameter chamber 54 in bore 56. Piston boots 57 are present within reduced diameter chambers 46, 52 and ensure contaminants do not enter fluid chamber 40. Piston boots 57 may be described as accordion-type shapes and moves with pistons 32, 36 during travel. After sufficient travel of pistons 32, 36, projecting flange 42 engages a stator plate 58 of a first stator assembly, generally indicated by the numeral 60, and projecting flange 50 engages a stator plate 62 of a second stator assembly, generally indicated by the numeral 64.

Pistons 32, 36 may further include a threaded hole 65 for assistance with removing pistons 32, 36 for service or replacement. A bolt or threaded rod is threaded into threaded hole 65 to thereby remove a piston 32, 36.

Stator plate 58 includes a friction pad 66 and stator plate 62 includes a friction pad 68. The travel of stator assemblies 60, 64 causes friction pads 66, 68, which may also be referred to as stator pads, to contact rotor 14 to enact a braking function on rotor 14 upon travel of pistons 32, 36. The initial contact of rotor 14 by friction pads 66, 68 may be said to be initiation of the braking function, with further pressure and further contact providing additional braking function as desired.

Friction pads 66, 68 may be made of any of numerous friction materials known in the art and may be formed as generally known in the art. Friction pads 66, 68 may be integrally molded to stator plates 58, 62. As generally known in the art, stator plates 58, 62 may include stamped holes into which friction material is packed. Friction material is additionally formed into pads 66, 68. The forming of pads 66, 68 may also include one or more of pressing, oven heating, and bonding agents to form stator assemblies 60, 64. In their position in brake 10, the tops of friction pads 66, 68 may be aligned or substantially aligned with the top of rotor 14.

Stator assemblies 60, 64 are positioned to either side of a portion of rotor 14 so that the portion of rotor 14 is interposed therebetween. A sufficient portion of rotor 14 must be positioned between stator assemblies 60, 64 in order to cause the necessary braking function on rotor 14. Stator plates 58, 62 and friction pads 66, 68 are positioned to substantially parallel to rotor 14. Each stator plate 58, 62 may include projecting ears 70 at the longitudinal ends thereof having bores 72 therein for receiving stator pins 74 on which stator plate 58, 62 are freely slidably mounted. Stator pins 74 are located above the diameter of rotor 14 and at a span approximately the length of stator pads 66, 68. Stator pins 74 guide the travel of stator assemblies 60, 64 during the brake function. Stator pins 74 additionally hold stator assemblies 60, 64 in position and are used to react against the torque created by the braking event at rotor 14.

Each stator pin 74 is held in position using a bolt 76 and washer 78 combination screwed below the face of brake 10. That is, brake 10 has outer surface 80 and bolt 76 does not extend beyond outer surface 80, which may also be referred to as mounting face 80. Washer 78 and the head of bolt 76 may be said to be in a cutaway 82 in brake 10. Because bolt 76 does not extend beyond surface 80, such ensures there is not interference with any components beyond face 80 of brake 10. When secured in position, each washer 78 captures a portion of a face 84 of the respective stator pin 74, as best seen in FIG. 1, to maintain stator pin 74 within brake 10.

Figure 12:
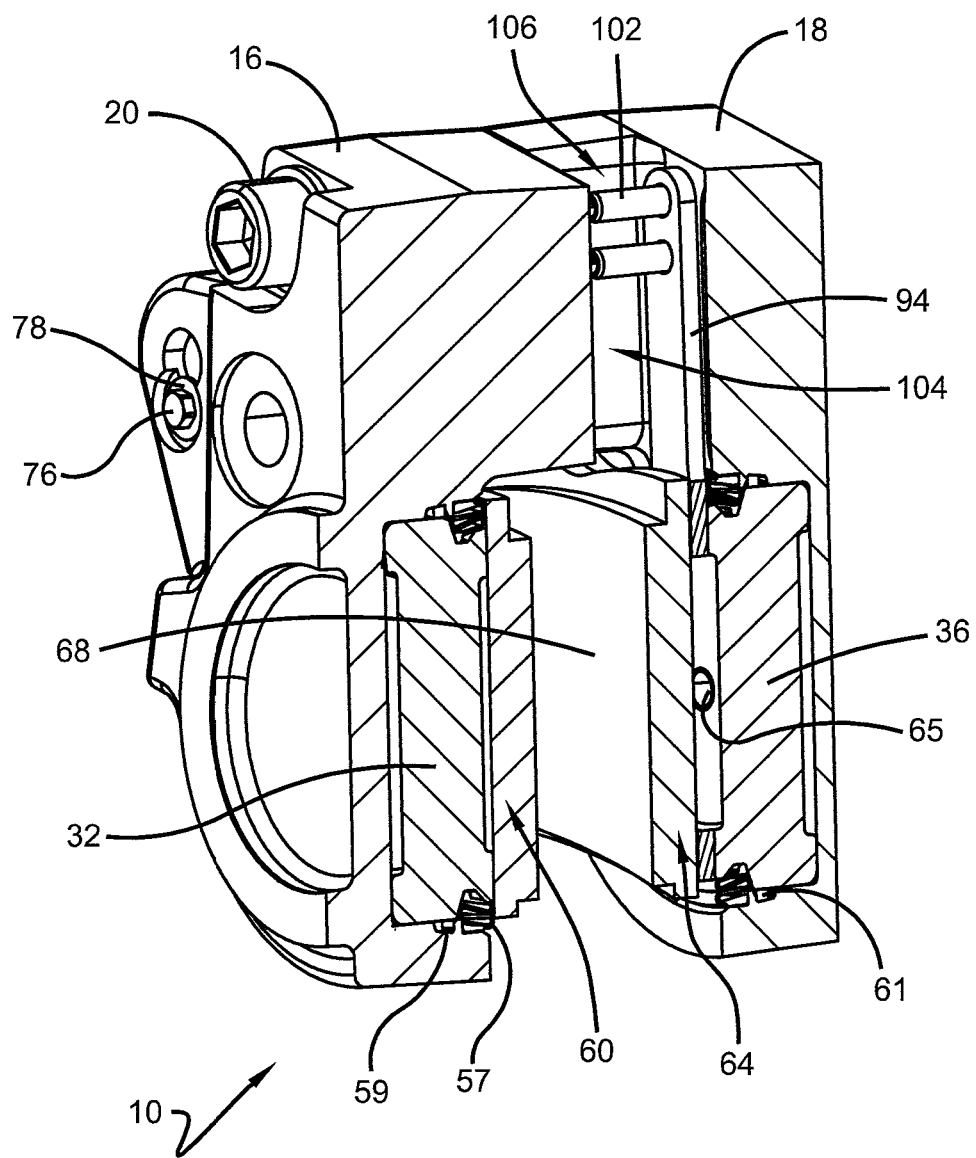
FIG. 12 is a sectioned perspective view of a caliper brake according to the concepts of the present invention.

To release brake 10, hydraulic fluid pressure is released to "zero" and some or all of the fluid in fluid chamber 40 returns to the source, such as a fluid reservoir. Then, pistons 32, 36 are allowed to travel back to the default position. As best seen in FIG. 12, square ring grooves 61 are sized as to cause square rings 59 to dynamically move back to default position by retraction. Square ring grooves 61 have a wider diameter portion extending to a narrow diameter portion. This enables square rings 59 to travel with fluid pressure and to revert when fluid pressure is released. Stator assemblies 60, 64 follow the travel of pistons 32, 36 back to the default position. Square rings 59 also provide a seal for fluid chamber 40. Returning stator assemblies 60, 64 and pistons 32, 36 back to the default position releases rotor 14 and allows it to more freely rotate.

Bleeders 86 may be present to purge air from fluid chamber 40. The other end of the bleeder channel 88 may include a hex socket plug 90 or other protective plug 92.

Figure 3:
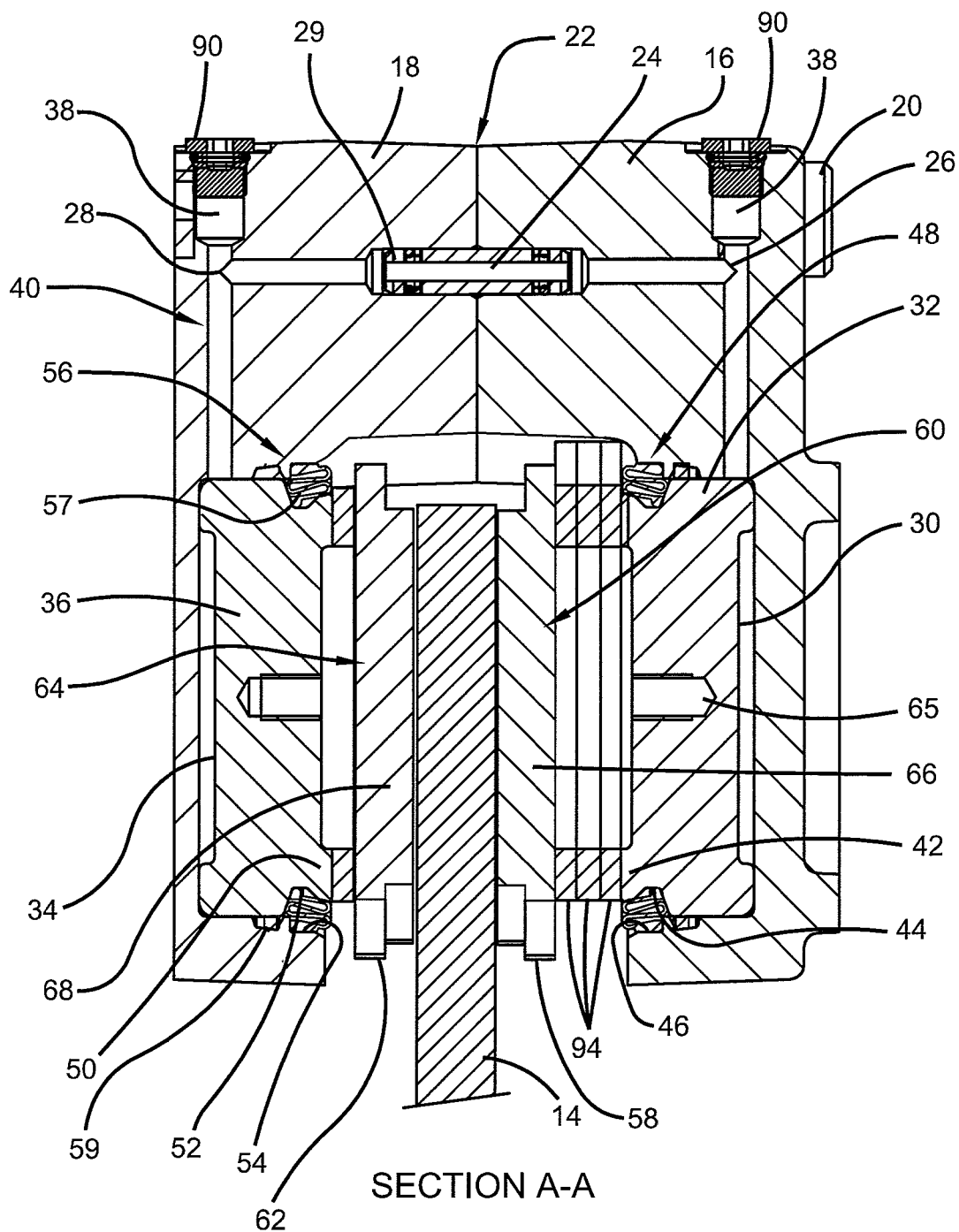
FIG. 3 is a sectional view similar to FIG. 2 but with shims being shown.
Figure 4:
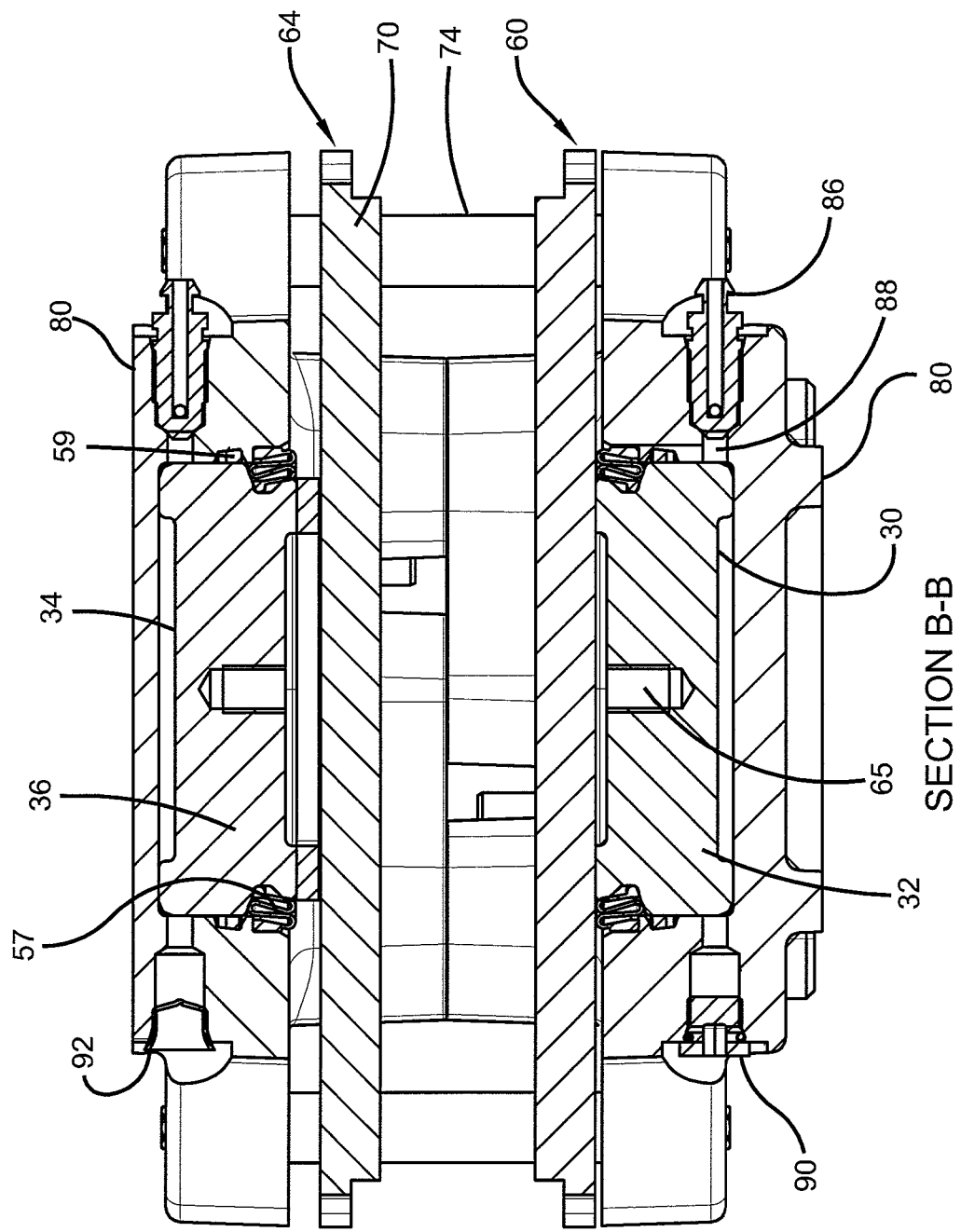
FIG. 4 is a sectional view taken substantially along line B-B of FIG. 1.
Figure 5:
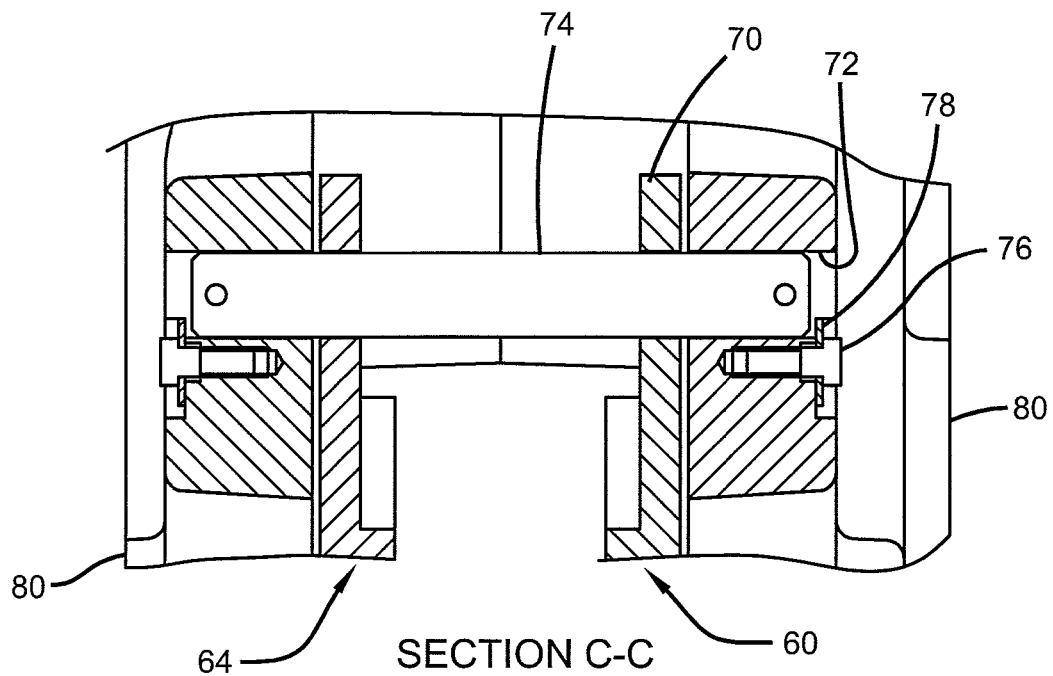
FIG. 5 is a sectional view taken substantially along line C-C of FIG. 1.
Figure 6:
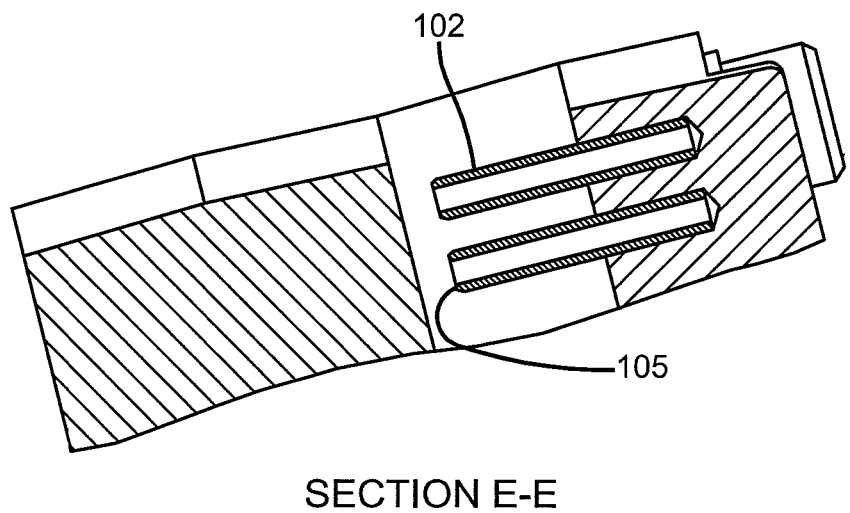
FIG. 6 is a sectional view taken substantially along line E-E of FIG. 1.
Figure 7:
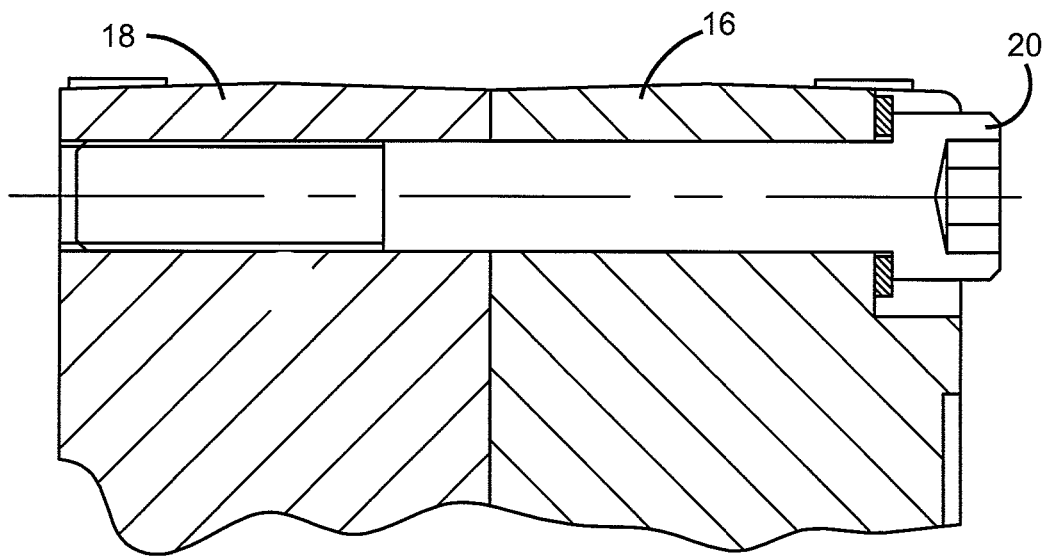
FIG. 7 is a sectional view taken substantially along line F-F of FIG. 1.
Figure 8:
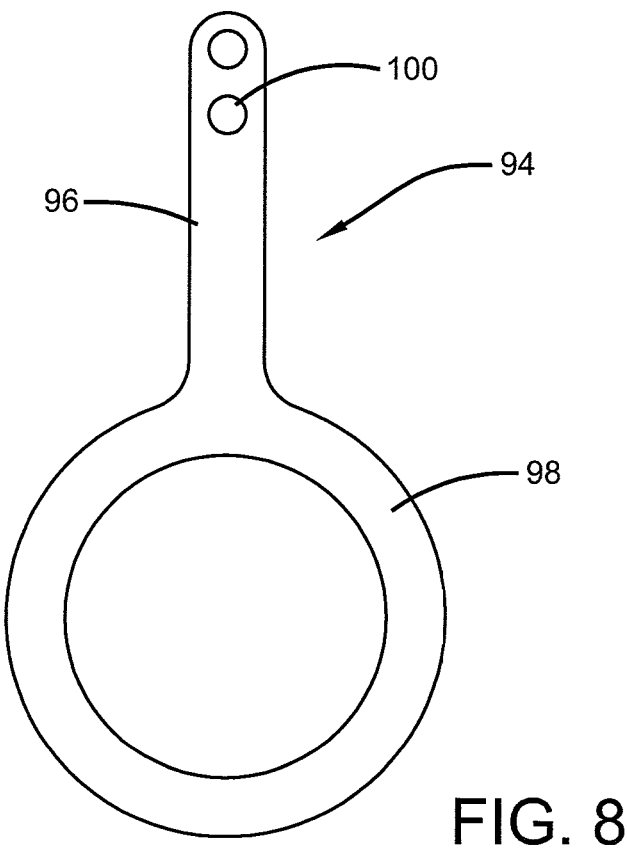
FIG. 8 is a front elevational view of a shim according to the concepts of the present invention.
Figure 9:
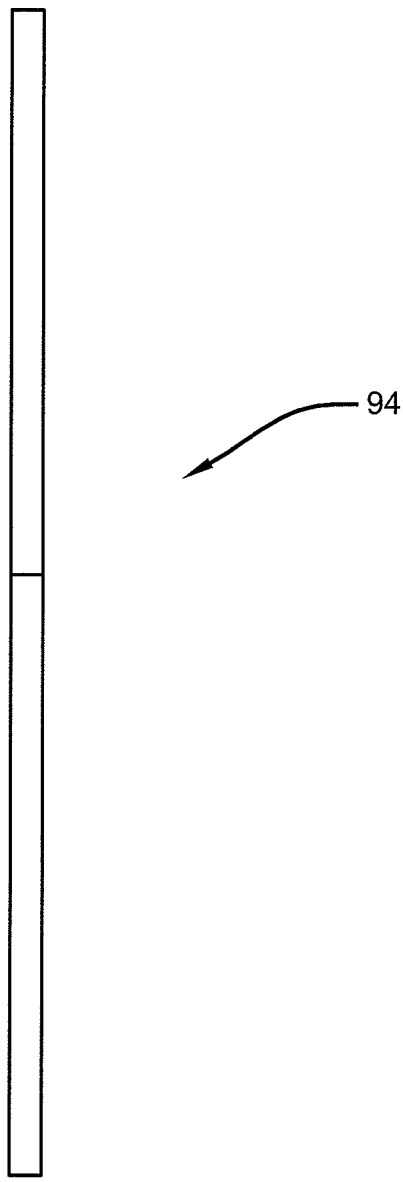
FIG. 9 is a side elevational view of a shim according to the concepts of the present invention.

Advantageously, brake 10 may be used with differing diameters, thicknesses, and axial offsets for rotor 14. This is accomplished using one or more shims 94. As best seen in FIG. 3, shims 94 are positioned between the face of pistons 32, 36 and the back of stator assemblies 60, 64. The placement of one or more shims 94 moves the friction face of stator assemblies 60, 64 to a required position with respect to rotor 14. The number of shims 94 utilized, if any, is dependent on rotor 14 thickness and the axial distance of rotor 14 from a flange used in connection with a tensioning apparatus. Any suitable number of shims 94 may be placed only on one side of rotor 14. In other embodiments, any suitable number of shims 94 may be placed on both sides of rotor 14.

Shims 94 include an elongated ear 96 extending from a circular base 98. Elongated ear 96 includes at least one hole 100, in certain embodiments, two holes 100, for placement on a corresponding number of pins 102. Pins 102, which may also be referred to as spring pins 102 or roll pins 102, are generally known mechanical fasteners capable of securing the position of a component of an apparatus. Pins 102 may be either slotted spring pins or coiled spring pins. The position of shims 94 is held by placing holes 100 on pins 102, with one end of pins 102 positioned in a corresponding hole (not shown) in housing 12. The portions of pins 102 not located in the housing holes are located in one or more channels 104 within bridge 22 of caliper housing 12. To secure pins 102 in housing, pins 102 may have a body diameter which is larger than the diameter of housing holes. Pins 102 may have a chamfer 105 on the end to facilitate starting pin 102 into the housing hole. The spring action of pin 102 allows it to compress as it assumes the diameter of the housing hole. The force exerted by pin 102 against the wall of the housing hole retains pin 102 in the housing hole. Therefore, pin 102 may be considered a self-retaining fastener. The body diameter of pins 102 may be smaller than the diameter of shim holes 100. This enables shims 94 to freely travel upon travel of pistons 32, 36.

Figure 13:
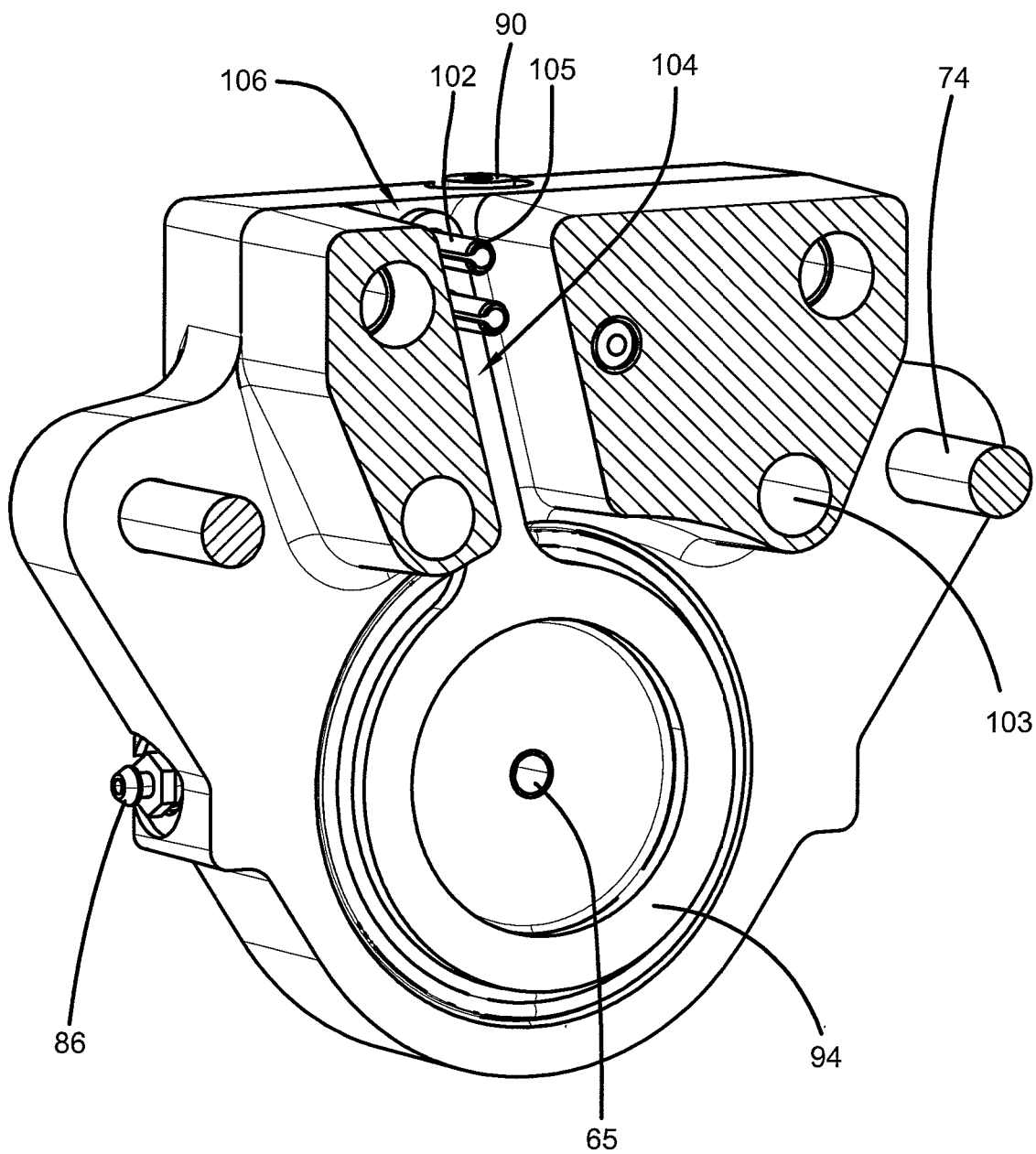
FIG. 13 is a sectioned perspective view of a caliper brake according to the concepts of the present invention.

Channel 104 is void of casting material that may interfere with shims 94. As best seen in FIG. 13, channel 104 may be at an acute angle with respect to the top of brake 10. In one or more embodiments, channel 104 may be at an angle as to avoid other components of brake 10. That is, as best seen in FIG. 13, channel 104 is at an angle that does not contact mounting locations 103 for a mounting bolt. If, for example, the bottom of channel 104 of FIG. 13 was moved such that channel 104 formed a right angle with respect to the top of brake 10, it might contact one of the mounting locations 103, thereby rendering the design unfeasible. Though, in other embodiments, channel 104 may be able to be positioned at a right angle while still avoiding other components of brake 10. In one or more embodiments, channel 104 may be at an angle that accomplishes one or more other desired design features.

Any desired shims 94 are positioned on pins 102 prior to mounting brake 10 to the mounting flange (discussed above) by utilizing bolts in one or more mounting locations 103. It should be appreciated that brake 10 may utilize a first number of shims 94, for example one shim, and then be un-mounted from the corresponding flange in order to utilize a second number of shims 94, for example three shims. Thus, a single brake 10 may be utilized with differing diameters, thicknesses, and axial offsets of rotor 14.

To add or remove one or more shims 94, brake 10 is removed from the flange in order to remove rotor 14 from between stator assemblies 60, 64. Then, stator assembly 60, 64 on the side where one or more shims 94 are to be added or removed may be moved toward the other stator assembly 64, 60 along stator pins 74 until the one or more shims 94 can be added or removed on the side of the moved stator assembly 60, 64. Then, brake 10 may be re-mounted to the flange. Thus, adding or removing one or more shims 94 does not require disassembly of either stator pins 74 or housing 12.

Figure 10:
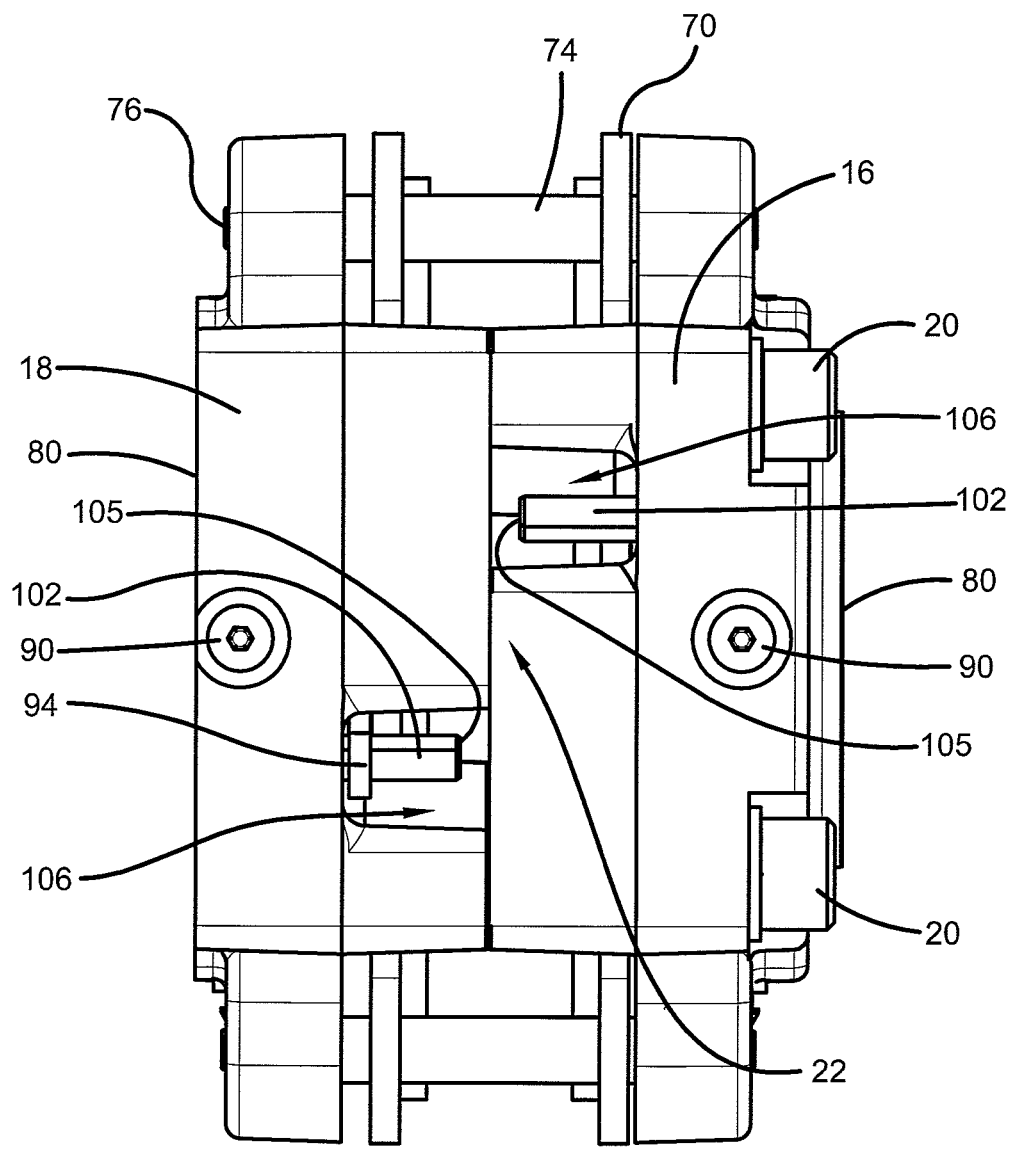
FIG. 10 is a top plan view of a caliper brake according to the concepts of the present invention.
Figure 11:
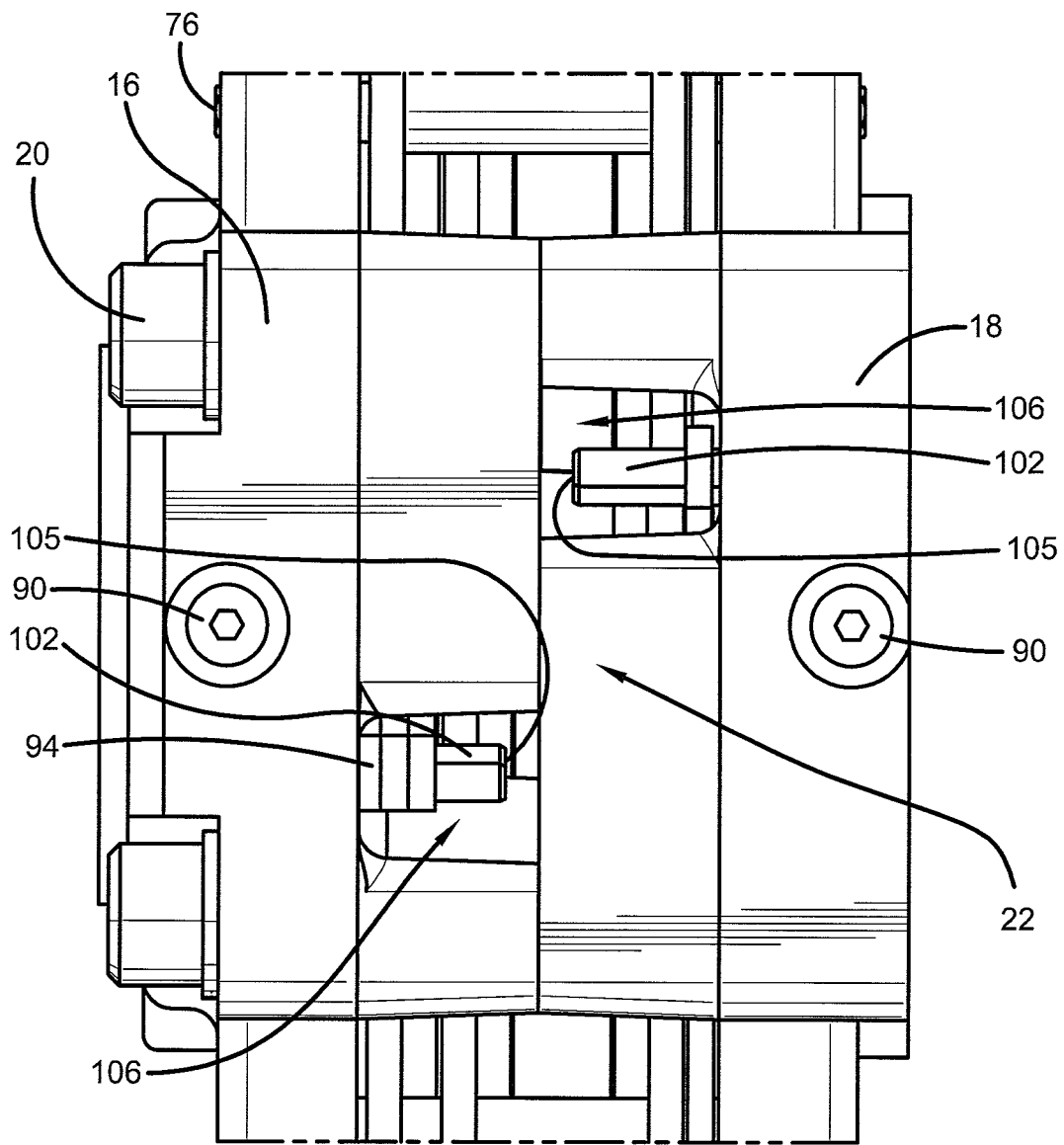
FIG. 11 is a top plan view of a caliper brake according to the concepts of the present invention with shims being shown.

As best seen in FIGS. 10 and 11, bridge 22 may include one or more openings 106 in order to view the current configuration of shims 94. FIG. 10 shows utilization of one shim 94 and FIG. 11 shows utilization of three shims 94.

Based on the utilization of one or more shims, brake 10 may be characterized by the particular sizes of rotor 14 with which brake 10 may be utilized. In one or more embodiments, brake 10 may be utilized with a rotor having a diameter of 15" and also with a rotor having a diameter of 60". In one or more embodiments, brake 10 may be utilized with a rotor having a diameter of 20". In one or more embodiments, brake 10 may be utilized with rotors having a diameter in the range of from 15" or more to 60" or less.

In one or more embodiments, brake 10 may be utilized with a rotor having a thickness of 0.500" and also with a rotor having a thickness of 1.125". In one or more embodiments, brake 10 may be utilized with rotors having a thickness in the range of from 0.500" or more to 1.125" or less.

For accessing stator assemblies 60, 64 when service is required (e.g. replacing pads 66, 68), stator pins 74 are removed, such that stator assemblies 60, 64 may also be removed. It may be desired that stator pins 74 are serviceable from the side of brake 10 that does not mount to the corresponding machine. The service is performed (e.g. adding new pads 66, 68) and then stator assemblies are re-positioned and stator pins 74 are added. Stator assemblies 60, 64 may be removed or serviced while brake 10 is mounted to the flange.

As mentioned above, a caliper brake of the present invention has industrial applicability based on utilization with reel carrier-tensioner equipment as commonly used to install electrical powerlines. As generally known in the relevant art, a reel contains electrical power line, and a puller pulls that line from the reel and tensions it along the top of power poles. A caliper brake of the present invention may be equipped with a reel carrier for causing a braking action of the reel carrier. This braking action aids in creating the necessary tension for the powerlines to be installed.

It is thus evident that a caliper brake constructed as described herein accomplishes the objects of the present invention and otherwise substantially improves the art.

What is claimed is:

1. A caliper brake comprising one or more shims, a housing formed of a first housing portion and a second housing portion, each of said first housing portion and said second housing portion including a channel extending therethrough, each of said channels including pins for receiving said one or more shims thereon, each of said pins including a first end positioned in a respective one of said first housing portion and said second housing portion and a second end positioned in a respective one of said channels, further comprising a first stator assembly and a second stator assembly coupled by a pair of stator pins.

2. A caliper brake comprising a housing formed of a first housing portion and a second housing portion, each of said first housing portion and said second housing portion including a channel extending therethrough, each of said channels including pins for receiving one or more shims thereon, further comprising a first stator assembly having a first stator pad and a second stator assembly having a second stator pad, said first stator pad and said second stator pad being spaced a first distance, said first stator pad and said second stator pad being spaced a second distance that is less than said first distance when one or more shims are positioned on said pins, wherein one or more shims are positioned on said pins of at least one of said channels, said one or more shims including an elongated ear extending from a circular base, said elongated ear including holes for positioning said holes on said pins of said at least one of said channels.

3. The caliper brake of claim 2, each of said channels including only two pins and each of said one or more shims including only two holes.

4. The caliper brake of claim 1, said channel in said first housing portion extending to a first opening and said channel in said second housing portion extending to a second opening, such that the number of shims positioned on said pins may be determined by looking through said first opening and said second opening.

5. The caliper brake of claim 1, said channel in said first housing portion extending at an angle that avoids all components of the caliper brake other than said pins, and said channel in said second housing portion extending at an angle that avoids all components of the caliper brake other than said pins.

6. A caliper brake comprising one or more pins capable of receiving one or more shims, a first hydraulic channel providing hydraulic fluid behind a first end of a first piston, a second hydraulic channel providing hydraulic fluid behind a first end of a second piston, said first piston having a second end abutting a first stator assembly, said second piston having a second end abutting a second stator assembly, wherein said first stator assembly and said second stator assembly are separated by a first distance when no shims are on said pins and by a second distance less than said first distance when one or more shims are on said pins, said first stator assembly receiving a first end of a first stator pin and a first end of a second stator pin, said second stator assembly receiving a second end of said first stator pin and a second end of said second stator pin, said first stator pin having an end, said second stator pin having an end, each of said first stator pin and said second stator pin being held in position by a corresponding bolt and washer, each of said washers positionally overlapping the corresponding stator pin end.

7. The caliper brake of claim 6, said first hydraulic fluid channel and said second hydraulic fluid channel being in fluid communication by way of a connector tube positioned within said first hydraulic fluid channel and said second hydraulic fluid channel.

8. The caliper brake of claim 6, further comprising a housing having a channel therein, said one or more pins being positioned in said housing channel.

9. The caliper brake of claim 8, said one or more shims including an elongated ear extending from a circular base, said elongated ear including at least one hole for positioning said at least one hole on a corresponding pin of said pins.

10. The caliper brake of claim 9, said housing channel including only two pins and each of said one or more shims including only two holes.

11. A method of adjusting the brake of claim 1, comprising the steps of moving the first stator assembly toward the second stator assembly, and installing, after the step of moving the first stator assembly, at least one of the one or more shims on the pin in the first housing.

12. The method of claim 11, further comprising the steps of moving the second stator assembly toward the first stator assembly, and installing, after the step of moving the second stator assembly, at least one of the one or more shims on the pin in the second housing.

13. The method of claim 11, wherein the steps of moving and installing are accomplished without separating the housing into the first housing portion and the second housing portion.

14. The caliper brake of claim 1, said second end including a chamfer.

15. The caliper brake of claim 2, said channel in said first housing portion extending to a first opening and said channel in said second housing portion extending to a second opening, such that the number of shims positioned on said pins may be determined by looking through said first opening and said second opening.

16. The caliper brake of claim 2, said channel in said first housing portion extending at an angle that avoids all components of the caliper brake other than said pins, and said channel in said second housing portion extending at an angle that avoids all components of the caliper brake other than said pins.

* * * * *